3,122,199
METHOD OF CONTROLLING THE FLOW OF HEAT TRANSFER FLUID
Robert C. Byloff, Los Angeles, Calif., assignor to The Garrett Corporation, Los Angeles, Calif., a corporation of California
Filed Dec. 2, 1959, Ser. No. 856,745
2 Claims. (Cl. 165—2)

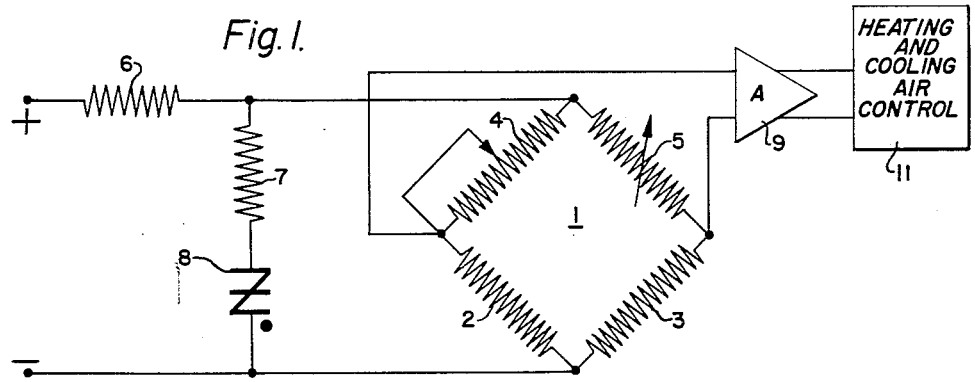
Feb. 25, 1964   R. C. BYLOFF   3,122,199
METHOD OF CONTROLLING THE FLOW OF HEAT TRANSFER FLUID
Filed Dec. 2, 1959
INVENTOR.
ROBERT C. BYLOFF,

United States Patent Office  
3,122,199  
Patented Feb. 25, 1964

This invention relates to a method of controlling the flow of heat transfer fluid to an enclosure to maintain a predetermined temperature within the enclosure, or of equipment therein, in which the amount of heating or cooling fluid supplied is controlled in accordance with the heating or cooling requirements of a sensor exposed to the flow of the heat transfer fluid.

In the operation of various equipment which becomes heated in operation, such as electronic and other electrical equipment, it is desired to carry away the developed heat so as to maintain the equipment below a desired maximum operating temperature. Heretofore the control of cooling air to such equipment has been carried out principally from temperature-responsive elements reporting substantially the value of the temperature of the ambient air adjacent the equipment, such as for example, the ambient air within an enclosure housing the equipment. In this type of control, particularly at higher values of weight flow of air corresponding to higher heat generation in the equipment and a greater amount of heat to be removed, the cooling air supplied to the enclosure may actually be greater than that needed to remove the undesired heat, even though the ambient temperature-responsive sensor is calling for more cooling air.

The supplying of cooling air requires power and in many instances this power requirement makes an undesirable drain upon the total power available to the system in which the electronic or other equipment is integrated. It is, therefore, an object of this invention to provide a method of controlling the supply of cooling air which shall economize on the amount of cooling air, and hence on the power requirement therefor by supplying the minimum required to remove the undesired heat.

Another object of the invention is the method of controlling the supply of cooling fluid to remove undesired heat which comprises controlling the supply of cooling fluid by the value of a sensor also dissipating heat to the cooling fluid.

Another object of the invention is the method of controlling tthe flow of heat transfer fluid which comprises operating a thermistor disposed in said flow within its self-heating region so that the resistance of the thermistor is a function of the heat dissipation therefrom, and controlling the supply of heat transfer fluid in accordance with the resistance of the thermistor.

Another object of the invention is the method of controlling the supply of heat transfer fluid to an enclosure which comprises operating a thermistor within its self-heating region with a heat dissipating or absorbing requirement for a selected resistance which corresponds to the heat dissipating or absorbing requirement of the enclosure, passing said fluid in heat transfer relation with said thermistor, and controlling the supply of fluid in accordance with the value of said resistance.

Other objects and features of the invention will be readily apparent to those skilled in the art from the following specification and appended drawing, in which:

FIGURE 1 is a schematic representation of a system in which the method of control of this invention may be carried out.

FIGURE 2 is a voltage-current graph, showing the variation in the resistance of a thermistor at various voltages and for varying flow rates of cooling air.

Explaining first the system schematically shown in FIGURE 1, in which the method of the invention may be carried out, there is shown a resistance bridge 1 having a pair of fixed legs 2 and 3, an adjustable leg 4 and a thermistor 5. The bridge is fed with a constant direct current voltage provided from the indicated source and regulated in value by a dropping resistor 6 and a parallel circuit comprising a limiting resistor 7 and a Zener diode 8. The diode 8 is polarized to be nonconducting until the D.C. supply voltage exceeds its avalanche voltage in the reverse or non-conducting direction, at which time current will flow through the circuit 6, 7 and 8 to lower the voltage across the bridge by the drop through the resistor 6. The output of bridge 1 is fed through an amplifier 9 to the heating and cooling air control 11 which may operate any ultimate flow control means, such as louvres, fans, valves, compressors, etc. The control 11 may include a polarized relay to control the stopping and/or direction of rotation of an electric motor controlling a louvre or valve, and such motor control might also be electronic in nature with the bridge output supplying a signal to an electric control circuit such as shown in the patent to Schenk et al., No. 2,703,679, granted March 8, 1955, for Electronic Temperature Regulator, or, alternatively, the error signal from the bridge output might be fed to a magnetic amplifier control circuit, such as disclosed in applicant's co-pending application, Serial No. 513,091, filed June 3, 1955, now Patent No. 3,021,474, for Magnetic Amplifier Control Apparatus.

In any of the above-mentioned control arrangements, resistance values of the sensor thermistor 5 will determine the magnitude and polarity of the output signal from the bridge 1, and this signal will determine whether a correction to the amount or weight flow of air shall be applied, and the sense of the correction.

In the operation of control systems of the type diagrammatically shown in FIGURE 1, it is customary to operate the thermistor 5 below its self-heating region. As known in the art, and as used in this application, the term "self-heating" as applied to a thermistor, means that zone in which the internal heat generated in the thermistor can no longer be dissipated in still air so that the temperature of the thermistor rises from heat generated within itself and the voltage-current relationship departs from Ohm's law in that the resistance of the thermistor lowers and a greater current is passed thereby.

To illustrate this manner of operation and how it is affected by rate of flow of cooling air, a family of curves is shown on the graph of FIGURE 2, which are drawn with voltage ordinates against current abscissae. The straight line represents an Ohm's law relationship between current and voltage at a constant resistance of 1420 ohms for the thermistor at a constant temperature of 103° F. To secure the curves, the voltage across the thermistor was varied, and the resulting current plotted in still air and at rates of flow of 50, 100 and 500 feet per minute. In the still air operation, it is seen that the thermistor entered its self-heating region, that is, the region in which the heat generated therein was greater than was dissipated, at about 4 volts and that at 10 volts the resistance of the thermistor had increased to 525 ohms. At higher rates of flow, the break point for self-heating or separation of the curve from the straight line occurred at higher values, successively, 5.5, 6.4 and 7.1 volts for the 50, 100 and 500 feet per minute flows. Also, it is noted that at the reference 10 volts the thermistor resistance values increased to 885 ohms, 1162 ohms and 1300 ohms, respectively, all of this with the air at constant density and constant temperature (103° F.).

Hence it will be seen that at a constant voltage, such as that selected at 10 volts in the graph, any value of weight flow of air will produce a definite ohmic value of the thermistor whose resistance can, therefore, be interpreted as indicative of a particular weight flow rate. Since the cooling effect in the thermistor produced by the air flowing across it is proportional to the weight flow of air, it is clear that as the density of the air changes, velocity must change to produce a desired resistance value in the thermistor so that the flows indicated in FIGURE 2 are to be taken as examples of weight flow, or of linear rates of flow for constant density only. Likewise the required rate of flow of cooling air will vary with the temperature of the air itself.

The size of the thermistor and the amount of self heating supplied thereto are selected in accordance with the heat dissipation requirements of the equipment to be cooled, with the weight flow and temperature of the cooling air the principal variables to which the thermistor is responsive so that just sufficient cooling air will be supplied to remove the rejected heat.

In carrying out the method of this invention, therefore, the heat dissipating requirement of the equipment to be cooled is determined, the size of the thermistor and the thermistor self heating point are selected in accordance with a heat dissipation from the thermistor corresponding to the heat dissipation required to remove the rejected heat of the equipment, and the resistance value for the thermistor likewise determined to produce a weight flow of cooling air to effect the desired heat dissipation from itself and from the equipment to be cooled. These values may be computed from known heat generation and transfer characteristics, or may be determined empirically. The resistance value is then set into the bridge 1 of FIGURE 1 by adjustment of the resistor leg 4, and the control will modulate to vary the weight flow of air in accordance with the requirement of the thermistor to effect heat dissipation therefrom to return it to the set resistance value. Thereafter, as long as the thermistor is maintained at the selected resistance value, the undesired heat of the equipment will be removed and the equipment operated at a safe temperature with a minimum supply of cooling air and minimum power expenditure therefor.

In the above operation, it will be appreciated that the thermistor 5 and the equipment from which the rejected heat is to be removed are in the same ambient atmosphere so that they will be influenced in the same manner thereby, and that they are exposed to the same flow of air so that heat dissipation will occur therefrom in a similar manner. Therefore, with the proper initial relationship between the thermistor, its self heating, the selected resistance and the heat dissipation requirements of the equipment, the value of the thermistor resistance at which the control modulates will produce the desired heat dissipation from the equipment.

The amount or flow of cooling air required to dissipate the self-generated heat to be lost to reduce the temperature of the thermistor to a value corresponding to the preselected modulating resistance thereof is the same as is required to remove the rejected heat of the equipment to be cooled. This follows from the tailoring of the size, self heating and resistance values of the thermistor to the heat-dissipating requirements of the equipment. Stated differently: When the flow of cooling air is sufficient to maintain the thermistor at the selected resistance, it is also sufficient to remove the rejected heat from the equipment to be cooled. This follows regardless of the temperature and density of the cooling air, since the thermistor and equipment are exposed to the same cooling effects.

While the invention has been heretofore described with particular reference to the supply of cooling air to remove undesired heat, it will be understood that the invention functions equally well to modulate the supply of a heating fluid, which may be air, where the enclosure or the equipment therein tends to operate below a desired temperature at which the control is set to modulate. For example, in the thermistor whose performance curves are shown in FIGURE 2, it will be assumed that the voltage across the thermistor within the bridge 1 is 10 volts and that a modulating resistance of 1162 ohms is selected by proper regulation of the variable resistance 4 so that bridge 1 is balanced when sensor 5 has resistance of 1162 ohms. Under the above conditions, should the resistance of the sensor thermistor be less than 1162 ohms, the bridge will be unbalanced in a direction to call for the supply of cooling air to bring the thermistor resistance back to 1162 ohms and, in the process, to effect the desired removal of rejected heat from the enclosure or equipment. Under this condition of existing heating the control will continue to modulate to the 1162 ohm point by supplying cooling air to the enclosure.

Under the above stated conditions, should the enclosure and/or equipment become cooled beyond the desired operating point, as where the exterior ambient might be extremely cold, the sensor thermistor resistance will rise above 1162 ohms. The bridge 1 then becomes unbalanced in the opposite direction and will call for the supply of heating fluid or air to the enclosure or equipment to bring the thermistor resistance back to 1162 ohms and, in the process, supply heat to raise the temperature within the enclosure and/or of the equipment. Under this condition of lowered operating temperature, the control will continue to modulate to the 1162 ohm resistance point of the sensor thermistor by varying the supply of heating air.

While certain preferred embodiments of the invention have been specifically disclosed, it is understood that the invention is not limited thereto, as many variations will be readily apparent to those skilled in the art and the invention is to be given its broadest possible interpretation with the prior art.

What is claimed is:

1. A method of controlling the flow of heat transfer fluid to means, the temperature of which is to be controlled, and to a sensor having a negative temperature coefficient of resistance whose heat transfer properties are a function of the heat transfer properties of said means, and which has a current passing therethrough of such a magnitude that a flow of said fluid is required to maintain its temperature at a desired level, with said sensor and said means being subject to the same ambient temperature conditions, which method comprises: disposing said sensor directly in said flow; applying a voltage across said sensor sufficient to pass a current therethrough of such a magnitude as to operate said sensor within a range where said current will effect a generation of heat within the sensor greater than the heat dissipated therefrom in a static flow condition so that the resistance of the sensor is directly indicative of the weight flow rate and temperature of said fluid, with there being a differential in temperature between said sensor and said heat transfer fluid to cause heat transfer therebetween; adjusting the resistance value of said sensor to a predetermined value indicative of a predetermined fluid flow required to dissipate heat from said means, the temperature of which is to be controlled; maintaining said applied voltage substantially constant throughout the operation of said sensor except as affected by internal changes in resistance; and modulating the flow of fluid to maintain the resistance of said sensor at said predetermined value through variation in the heat dissipation therefrom, with the modulated fluid flow at any time being that required to establish said predetermined sensor resistance value.

2. A method of controlling the flow of heat transfer fluid as recited in claim 1 wherein the sensor disposed in said flow comprises a thermistor.

References Cited in the file of this patent

UNITED STATES PATENTS

| | | |
|---|---|---|
| 1,919,743 | Peters | July 25, 1933 |
| 2,137,059 | Moreau | Nov. 15, 1938 |
| 2,487,556 | Jenkins | Nov. 8, 1949 |
| 2,545,353 | Gund | Mar. 13, 1951 |
| 2,547,933 | Fitzgerald | Apr. 10, 1951 |
| 2,601,867 | Alyea | July 1, 1952 |
| 2,923,759 | Swan | Feb. 2, 1960 |